UNITED STATES PATENT OFFICE.

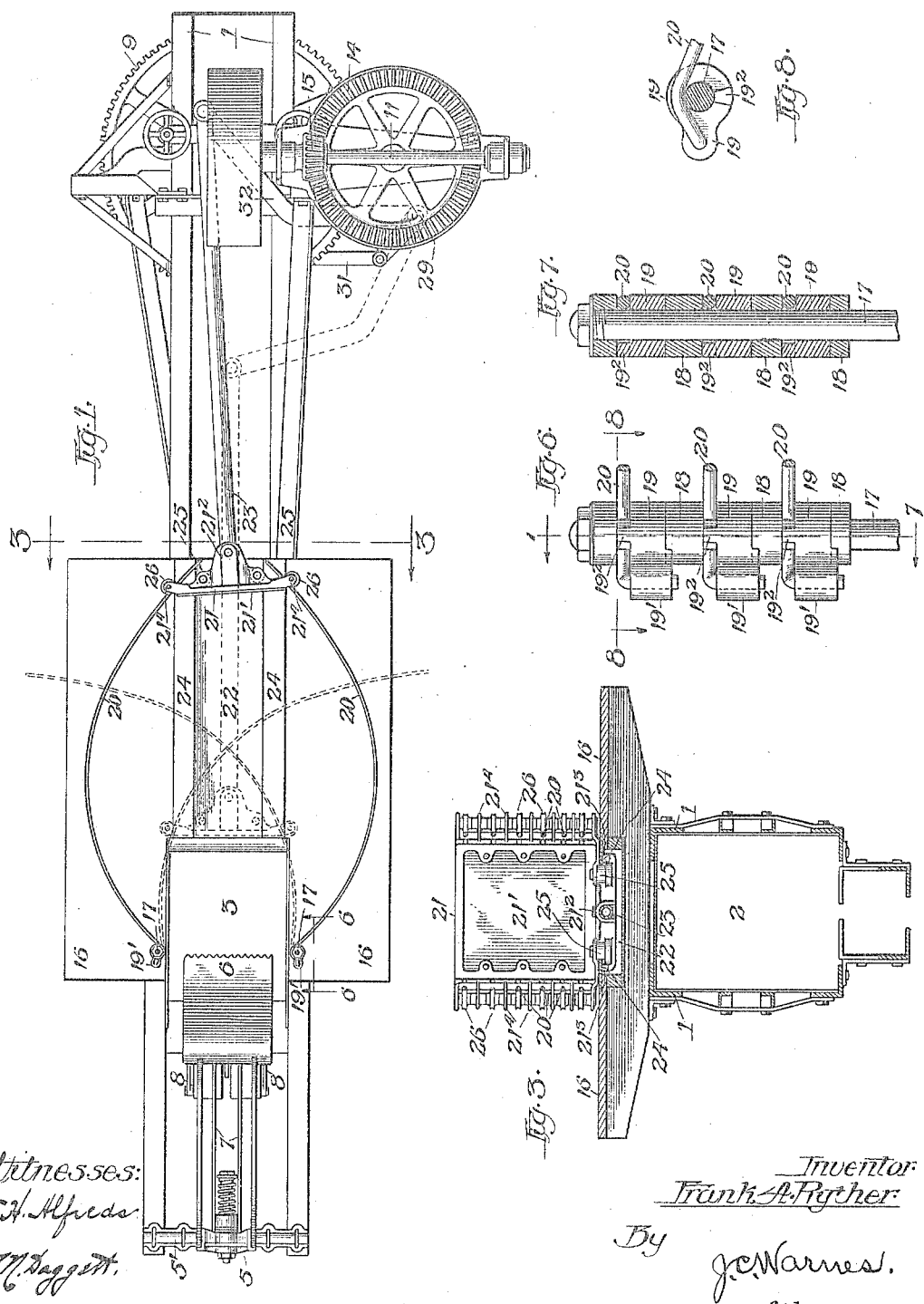

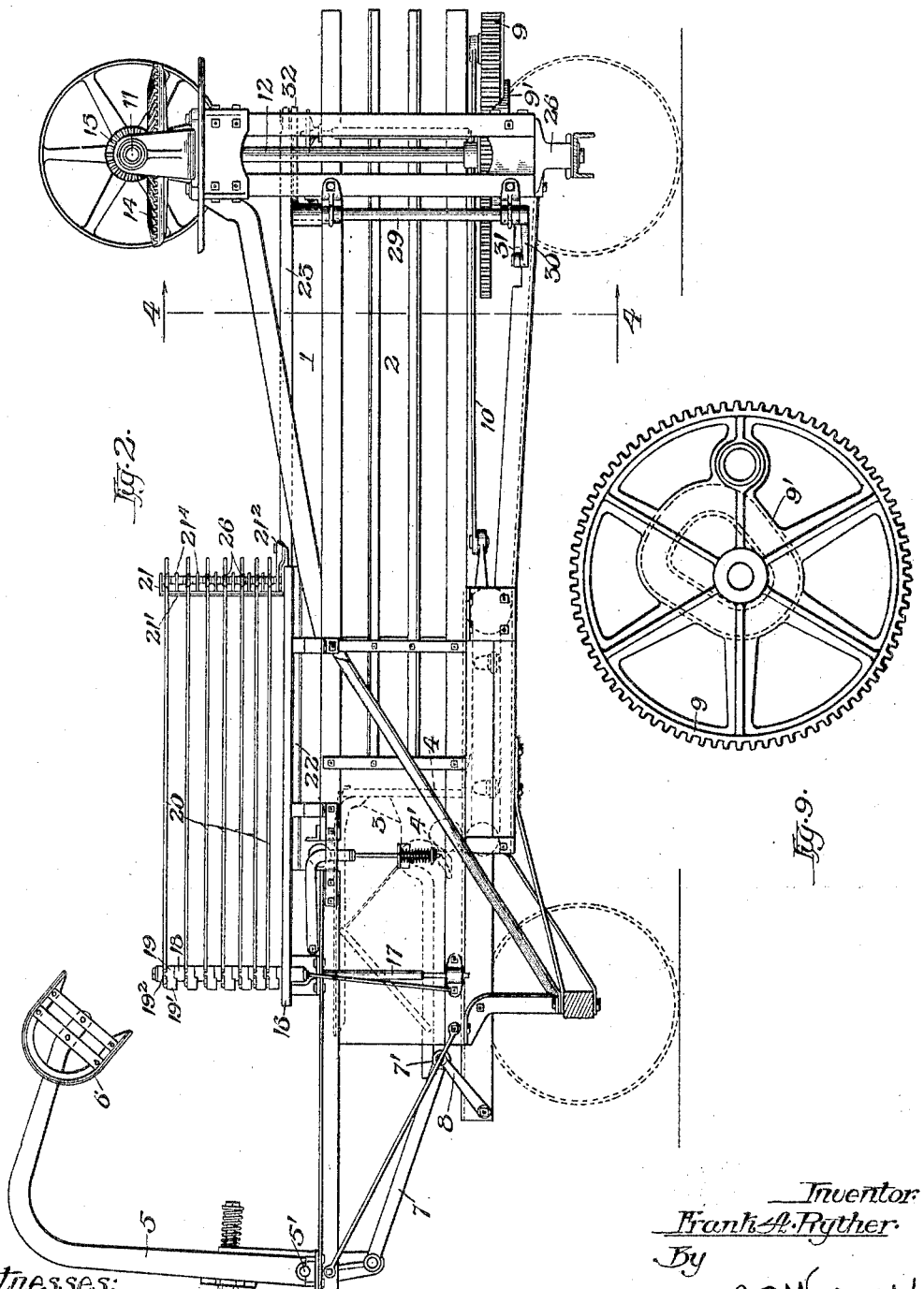

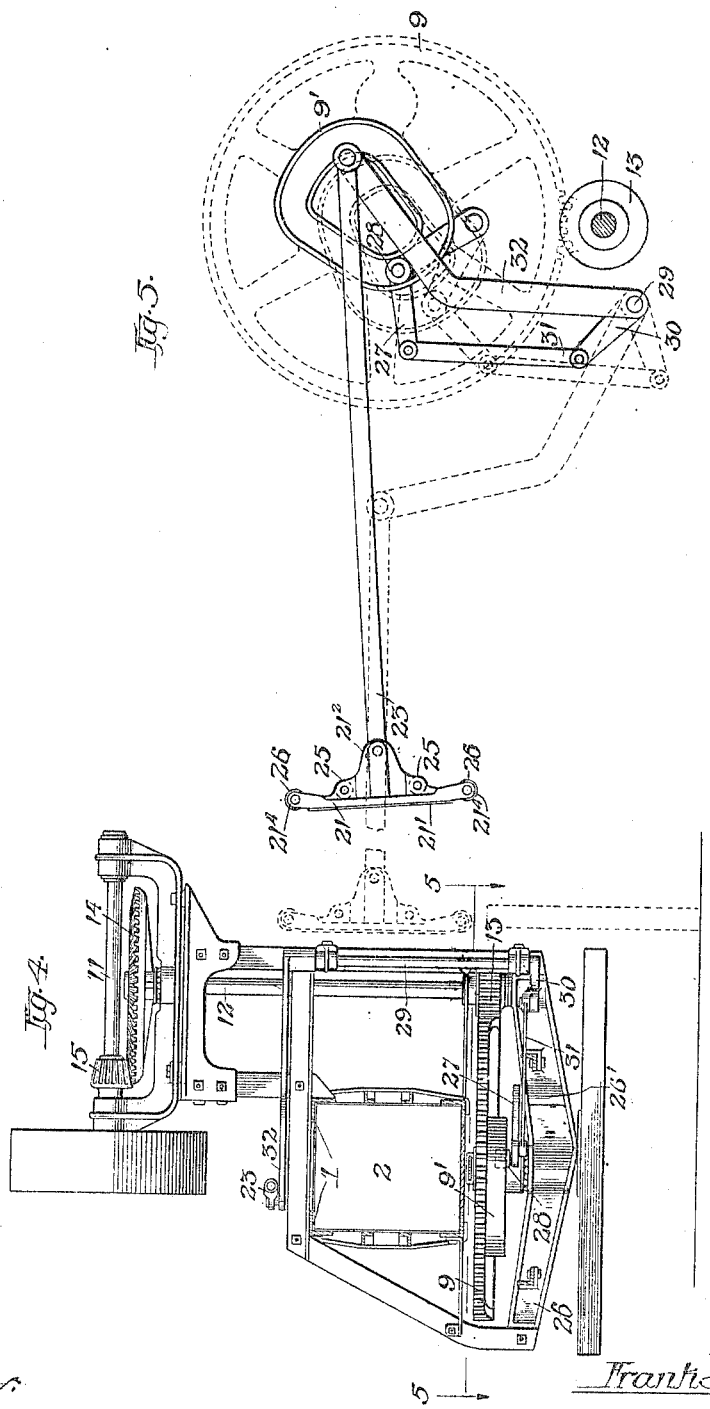

FRANK A. RYTHER, OF CHICAGO, ILLINOIS.

CONDENSER FOR HAY-BALERS.

No. 802,325.  Specification of Letters Patent.  Patented Oct. 17, 1905.

Application filed June 19, 1905. Serial No. 265,860.

*To all whom it may concern:*

Be it known that I, FRANK A. RYTHER, a citizen of the United States, residing at Chicago, in the county of Cook and State of Illinois, have invented a new and useful Improvement in Condensers for Hay-Balers, of which the following is a complete specification.

This invention relates to means for initially compressing the charge of hay preparatory to forcing it into the compression-chamber, the object being to construct an improved and simple means for accomplishing such initial compression and to provide a construction for the condenser sides which will largely prevent the upward movement of the hay in contact therewith while being condensed.

Other novel features have been incidentally disclosed in the illustration of the present invention; but such features constitute a portion of the subject-matter of an application filed by me on even date herewith, Serial No. 265,996, for a baling-press.

The construction and application of the invention are illustrated in the accompanying drawings, in which—

Figure 1 represents a plan of a baler-frame embodying my improvement, and Fig. 2 is a corresponding side elevation of same. Fig. 3 represents a transverse section of the baler, taken adjacent to the movable condenser-head, as indicated by the line 3 3 in Fig. 1; and Fig. 4 is a similar transverse section designed to show the driving mechanism mounted on the front end of the baler, the section being taken adjacent to said mechanism and on the line 4 4 of Fig. 2. Fig. 5 is a plan section of the driving mechanism through which the condenser is actuated, the section being taken as indicated by the line 5 5 in Fig. 4. Fig. 6 is a fragmentary view showing in side elevation one of the supporting-standards on which is pivoted the condenser-fingers, the direction of the view being indicated by the line 6 6 in Fig. 1. Figs. 7 and 8 represent, respectively, a vertical and a transverse section through the parts illustrated in the preceding figure, the views being taken on the lines 7 7 and 8 8, as indicated in Figs. 6 and 9.

In the drawings, 1 designates the frame of the baler, forming at its front end the baling-chamber 2 and at its rear end the compression-chamber 3, within which operates the reciprocating plunger 4. A rocking feed-lever 5, pivoted at 5' and provided with the feeder-head 6, is actuated by the plunger 4, through the link connection 7. The link 7 is pivotally connected at its rear end to the lower end of the feed-lever 5, the forward end of said link being controlled by the rocking arm 8. A roller 7' at the lower end of the link 7 detachably engages a hook 4' on the rear end of the plunger 4 and in this manner operates the feed-lever 5. The plunger connects with and is driven by the large gear 9, through the pitman 10, the said gear being driven from the cross-shaft 11 by means of the vertical shaft 12 and its gear connections. This gear connection is formed at the lower end of the vertical shaft 12 by the pinion 13 and at the upper end thereof by means of the bevel-gear 14 and the bevel-pinion 15 on said cross-shaft.

On either side of the opening into the compression-chamber 3 and extending forwardly therefrom is the feed-table 16.

Secured to the frame of the baler and projecting upwardly from the rear end of said table immediately adjacent to the opening into the compression-chamber are the fixed standards or posts 17, upon which in alternate relation are sleeved the distance-collars 18 and the condenser-finger supports 19. The finger-supports 19, details of which appear in Figs. 6, 7, and 8, consist of a collar portion with the laterally-projecting boss portion 19' and the upwardly-projecting lug $19^2$, the function of the former being to receive the bent ends of the condenser-fingers 20 and the function of the latter to support the adjacent collar and provide space in which the fingers can freely operate. The fingers 20 are preferably made of round high carbon-steel and curved outwardly intermediate of their length.

The finger-fastenings above described render the fingers pivotally movable about the supporting-standards 17. As will appear from an inspection of Figs. 2 and 3, the lower fingers 20 are arranged somewhat closer together in order to meet the increased pressure from the charge of hay which occurs at this portion of the condenser. This result is accomplished by making the lower collars 18 of less thickness than the upper ones.

To actuate the fingers 20, the following-described means are employed: A condenser-head 21 is made to reciprocate in the way 22, formed in the table 16. The condenser-head 21 consists of a rectangular-shaped open casting, the open portion being covered by means of the sheet-metal plate 21', and on the lower side of the head is formed the lug $21^2$, which engages the condenser-pitman 23. Inwardly-projecting guide-strips 24, on which rests the condenser-head 21, are arranged on each side of the way 22. Beneath these guide-strips are received the engaging-shoulders 21³ of said condenser-head, these shoulders operating to keep the head in proper position in its longitudinally-extending way. To relieve from lateral friction, the rollers 25 are suitably journaled in the condenser-head and bear against the guide-strips 24, as clearly shown in Figs. 1 and 3. On the sides of the head 21 and formed integral therewith is a series of lugs or ribs 21⁴, between which are journaled a series of grooved rollers 26. These grooved rollers correspond in vertical disposition with the series of condenser-fingers 20, the forward or free ends of which are engaged by said rollers. Other forms of sliding connection might be provided between the condenser head and fingers; but the rollers are preferred in order to reduce friction.

Longitudinal movement is imparted to the condenser-head 21 by the following means: On the large driving-gear 9 (see Figs. 5 and 9) is formed a cam-track 9'. Pivotally mounted on the bolster 26 with the pivotal bearing in the boss 26' is the angular lever-arm 27, carrying the roller 28, which engages the said cam-track 9', the roller being mounted at the point of deflection, as shown in Fig. 5. A vertically-arranged rock-shaft 29, mounted in suitable bearings, has provided at its lower end the arm 30, which connects with the lever-arm 27, through the link 31, and in this manner has imparted to it a rocking movement by the cam 9'. To the upper end of the rock-shaft 29 is secured the inwardly-extending curved arm 32, the inner end thereof connecting with the condenser pitman-rod 23.

In operation the arm 32 is made to vibrate back and forth through the cam 9' on the large gear 9 and the intermediate link connection just described. The condenser-head 21 is given a reciprocating movement by the pitman 23, and as the said condenser-head moves rearwardly from the full-line to the dotted-line position of Fig. 1 the condenser-fingers will be forced inwardly by the rollers 26 until they occupy a position above the edge of the opening into the compression-chamber 3. The charge being compressed the feed-head on the feed-lever will descend and push the charge into the compression-chamber. The fact that the walls of the condenser are constructed of a series of fingers instead of a flat surface will cause the hay to be pressed outwardly slightly between the fingers, and thus prevent that portion of the charge which lies adjacent to the fingers from flowing upwardly when the feeder-head presses heavily upon the central portion of the charge.

What I claim as my invention, and desire to secure by Letters Patent, is—

1. In a hay-baler, in combination, a compression-chamber, a reciprocating plunger operating therein, a feeding device, and a condenser located above said compression-chamber, said condenser comprising laterally-arranged pivotally-mounted, outwardly-curved walls, a longitudinally-moving condenser-head having a sliding connection with the free ends of the pivotally-mounted walls for actuating said walls, and means for imparting movement to said condenser-head.

2. In a hay-baler, in combination, a compression-chamber, a reciprocating plunger operating therein, a feeding device, and a condenser located above said compression-chamber, said condenser comprising laterally-arranged pivotally-mounted walls, each wall being formed of a plurality of outwardly-curved fingers, a longitudinally-moving condenser-head having a sliding connection with the free ends of the pivotally-mounted walls for actuating said walls, and means for imparting movement to said condenser-head.

3. In a hay-baler, in combination, a compression-chamber, a reciprocating plunger operating therein, a feed-table provided with a longitudinally-extending way, a rocking feed-lever, and a condenser comprising laterally-arranged pivotally-mounted walls, each wall being formed of a plurality of outwardly-curved fingers, a longitudinally-moving condenser-head reciprocating in the way on said feed-table, a series of finger-engaging rollers journaled on each side of said head for controlling the free ends of the condenser-fingers, and means for imparting movement to the condenser-head.

FRANK A. RYTHER.

Witnesses:
S. W. NICHOLLS,
O. A. ANDERSON.